United States Patent
Hong et al.

(10) Patent No.: US 11,418,913 B2
(45) Date of Patent: Aug. 16, 2022

(54) SYSTEM AND METHOD FOR DISTANCE DETECTION

(71) Applicant: Old Cookies Co., Ltd., Taipei (TW)

(72) Inventors: Shih-Chiun Hong, Taipei (TW); Jih-Cherng Dennis Chen, Taipei (TW)

(73) Assignee: OLD COOKIES CO., LTD., Taipei (TW)

( * ) Notice: Subject to any disclaimer, the term of this patent is extended or adjusted under 35 U.S.C. 154(b) by 0 days.

(21) Appl. No.: 17/344,182

(22) Filed: Jun. 10, 2021

(65) Prior Publication Data

US 2021/0392455 A1 Dec. 16, 2021

(30) Foreign Application Priority Data

Jun. 12, 2020 (TW) .................................. 109207450
Aug. 12, 2020 (TW) .................................. 109127365

(51) Int. Cl.
*H04W 4/02* (2018.01)
*H04B 17/27* (2015.01)
(Continued)

(52) U.S. Cl.
CPC ............ *H04W 4/023* (2013.01); *H04B 17/27* (2015.01); *H04B 17/318* (2015.01); *H04W 4/33* (2018.02); *H04W 4/80* (2018.02)

(58) Field of Classification Search
CPC ......... H04W 4/023; H04W 4/80; H04W 4/33; H04W 4/14; H04W 76/15; H04B 17/27; H04B 17/318
See application file for complete search history.

(56) References Cited

U.S. PATENT DOCUMENTS

2016/0209495 A1* 7/2016 Hsu ........................ G01S 11/06
2019/0075724 A1* 3/2019 Becke .................... A01D 69/02

FOREIGN PATENT DOCUMENTS

CN 109544992 A 3/2019
CN 111461276 A 7/2020
(Continued)

OTHER PUBLICATIONS

Search Report appended to an Office Action, which was issued to Taiwanese counterpart application No. 109127365 by the TIPO dated May 28, 2021 with an English translation thereof.
(Continued)

*Primary Examiner* — Tuan H Nguyen
(74) *Attorney, Agent, or Firm* — Hamre, Schumann, Mueller & Larson, P.C.

(57) ABSTRACT

A distance sensing system includes a first electronic device and a second electronic device. A second processing unit of the second electronic device sends a wireless signal via a second short-range wireless communication unit. When a first processing unit of the first electronic device receives, via a first short-range wireless communication unit, the wireless signal from the second electronic device, the processing unit generates an estimated distance value indicating an estimated distance between the first electronic device and the second electronic device based on signal strength of the wireless signal. When the first processing unit of the first electronic device determines that the estimated distance value is less than a predetermined distance, the first processing unit outputs a notification via the first output unit, so as to send the notification to a user of the first electronic device when the second electronic device is close to the first electronic device.

11 Claims, 3 Drawing Sheets

(51) Int. Cl.
*H04W 4/80* (2018.01)
*H04W 4/33* (2018.01)
*H04B 17/318* (2015.01)

(56) References Cited

FOREIGN PATENT DOCUMENTS

| | | |
|---|---|---|
| TW | 201500249 A | 1/2015 |
| TW | M600396 U | 8/2020 |

OTHER PUBLICATIONS

Leung_ManWah, "CC2640R2F study notes (21)—Measure distance according to RSSI," <https://blog.csdn.net/qq_36347513/article/details/90731765>, Jun. 1, 2019, and corresponding English translation (3 pages).

* cited by examiner

SYSTEM AND METHOD FOR DISTANCE DETECTION

TECHNICAL FIELD

The present invention relates to a sensing system, and more particular to a distance sensing system.

PRIOR ART

When an epidemic breaks out, people should maintain an appropriate social distance, whether indoors or outdoors, in order to reduce the spread of a contagious disease among people.

However, at present, people can only rely on themselves to pay attention to the distances from other people around them. Therefore, a situation may occur that they are too close to others because of momentary negligence, and thus face a greater risk of being infected.

CONTENT OF INVENTION

Therefore, an object of the present invention is to provide a distance sensing system that can solve the above-mentioned problem.

Accordingly, the distance sensing system provided by the present invention includes a first electronic device and a second electronic device.

The first electronic device includes a first short-range wireless communication unit, a first output unit, and a first processing unit electrically connected to the first short-range wireless communication unit and the first output unit.

The second electronic device includes a second short-range wireless communication unit, and a second processing unit electrically connected to the second short-range wireless communication unit. The second processing unit outputs a wireless signal via the second short-range wireless communication unit. When the first processing unit of the first electronic device receives, via the first short-range wireless communication unit, the wireless signal from the second electronic device, the first processing unit generates an estimated distance value indicating an estimated distance between the first electronic device and the second electronic device based on signal strength of the wireless signal. When the first processing unit of the first electronic device determines that the estimated distance value is smaller than a predetermined distance, the first processing unit outputs a notification.

In some embodiments, the first electronic device further includes a first storage unit electrically connected to the first processing unit. The first storage unit stores a lookup table. The lookup table contains a plurality of distance parameter values and a plurality of ranges of number of devices, wherein the ranges of number of devices correspond respectively to the distance parameter values. Before the first processing unit determines whether the estimated distance value is smaller than the predetermined distance, the first processing unit generates a current number of devices based on a number of the received wireless signals, and sets a value of the predetermined distance to be equal to one of the distance parameter values based on the current number of devices and the lookup table, wherein the range of number of devices corresponding to the distance parameter value cover the current number of devices.

In some embodiments, said distance sensing system is further adapted to be electrically connected to a plurality of second electronic devices. When the first processing unit receives, via the first short-range wireless communication unit, the wireless signals from multiple ones of the second electronic devices, the first processing unit generates the estimated distance value based only on one of the wireless signals that has the strongest signal strength.

In some embodiments, said distance sensing system is further adapted to be electrically connected to a number M of second electronic devices, where M is an integer greater than one. When the first processing unit receives, via the first short-range wireless communication unit, the wireless signals from multiple ones of the second electronic devices, the first processing unit generates the estimated distance values based only on a number N of wireless signals with the strongest signal strength among the wireless signals, where N is an integer greater than one and not greater than M. When the first processing unit determines that the estimated distance values are all less than the predetermined distance, the first processing unit outputs the notification via the first output unit.

In some embodiments, the first electronic device further includes a first storage unit electrically connected to the first processing unit, and a first positioning unit electrically connected to the first processing unit. The first positioning unit is used to generate a positioning result. The first storage unit stores a lookup table. The lookup table contains two distance parameter values, and two indoor-outdoor parameters corresponding respectively to the distance parameter values. The indoor-outdoor parameters indicate indoor and outdoor, respectively. Before the first processing unit determines whether the estimated distance value is smaller than the predetermined distance, the first processing unit generates, based on the positioning result, an indoor-outdoor analytical result that indicates whether it is located indoors or outdoors, wherein the indoor-outdoor analytical result generated by the first processing unit indicates that it is located outdoors when the first processing unit determines that satellite signal strength contained in the positioning result is greater than a satellite signal predetermined threshold value, and the indoor-outdoor analytical result generated by the first processing unit indicates that it is located indoors when the first processing unit determines that the satellite signal strength is not greater than the satellite signal predetermined threshold value. The first processing unit sets a value of the predetermined distance to be equal to one of the distance parameter values based on the indoor-outdoor analytical result and the lookup table, wherein the indoor-outdoor parameter corresponding to the distance parameter value is the same as the indoor-outdoor analytical result.

In some embodiments, said distance sensing system further includes a first positioning unit electrically connected to the first processing unit, and is further adapted to be electrically connected to a remote server. The first positioning unit is used to generate a positioning result that indicates a current position. The first processing unit receives a plurality of sets of area data from the remote server, and outputs a notification via the first output unit when determining that the current position indicated by the positioning result is covered by an area indicated by one of the sets of area data.

Another object of the present invention is to provide a distance sensing method, which is to be executed by a distance sensing system. The distance sensing system includes a first electronic device and a second electronic device. The first electronic device includes a first short-range wireless communication unit, a first output unit, and a first processing unit electrically connected to the first short-range wireless communication unit and the first output unit. The second electronic device includes a second short-range wireless communication unit, and a second processing unit electrically connected to the second short-range wireless communication unit. The second processing unit outputs a wireless signal via the second short-range wireless communication unit. The distance sensing method includes: the first processing unit of the first electronic device generating an estimated distance value that indicates an estimated distance between the first electronic device and the second electronic device based on signal strength of the wireless signal when the first processing unit receives, via the first short-range wireless communication unit, the wireless signal from the second electronic device; and the first processing unit of the first electronic device outputting a notification when the first processing unit determines that the estimated distance value is smaller than a predetermined distance.

In some embodiments, the first electronic device further includes a first storage unit electrically connected to the first processing unit. The first storage unit stores a lookup table. The lookup table contains a plurality of distance parameter values and a plurality of ranges of number of devices, wherein the ranges of number of devices correspond respectively to the distance parameter values. The distance sensing method further includes: before the first processing unit of the first electronic device determines whether the estimated distance value is smaller than the predetermined distance, the first processing unit generating a current number of devices based on a number of the received wireless signals, and setting a value of the predetermined distance to be equal to one of the distance parameter values based on the current number of devices and the lookup table, wherein the range of number of devices corresponding to the distance parameter value cover the current number of devices.

In some embodiments, the first electronic device further includes a first storage unit electrically connected to the first processing unit, and a first positioning unit electrically connected to the first processing unit. The first positioning unit is used to generate a positioning result. The first storage unit stores a lookup table. The lookup table contains two distance parameter values, and two indoor-outdoor parameters corresponding respectively to the distance parameter values. The indoor-outdoor parameters indicate indoor and outdoor, respectively. The distance sensing method further includes: before the first processing unit of the first electronic device determines whether the estimated distance value is smaller than the predetermined distance, the first processing unit generating, based on the positioning result, an indoor-outdoor analytical result that indicates whether the first electronic device is located indoors or outdoors, wherein the indoor-outdoor analytical result generated by the first processing unit indicates that the first electronic device is located outdoors when the first processing unit determines that satellite signal strength contained in the positioning result is greater than a satellite signal predetermined threshold value, and the indoor-outdoor analytical result generated by the first processing unit indicates that the first electronic device is located indoors when the first processing unit determines that the satellite signal strength is not greater than the satellite signal predetermined threshold value; and the first processing unit of the first electronic device setting a value of the predetermined distance to be equal to one of the distance parameter values based on the indoor-outdoor analytical result and the lookup table, wherein the indoor-outdoor parameter corresponding to the distance parameter value is the same as the indoor-outdoor analytical result.

The effect of the present invention lies in that: the distance sensing system of the present invention notifies a user of the first electronic device that it is currently too close to other people by the first electronic device receiving the wireless signal, generating the corresponding estimated distance value based on the wireless signal, and outputting the notification when determining that the estimated distance value is smaller than the predetermined distance. In addition, the first electronic device sets the value of the predetermined distance to be equal to one of the distance parameter values based on the current number of devices, the indoor-outdoor analytical result and the lookup table, so as to allow the first electronic device to change the value of the predetermined distance according to the environment where it is currently in.

BRIEF DESCRIPTION OF DRAWINGS

Other features and effects of the present invention will be clearly presented in the embodying manner with reference to the drawings, in which.

EMBODYING MANNER

Before the present invention is described in detail, it should be noted that like elements are denoted by the same reference numerals throughout the following description.

Figure 1:
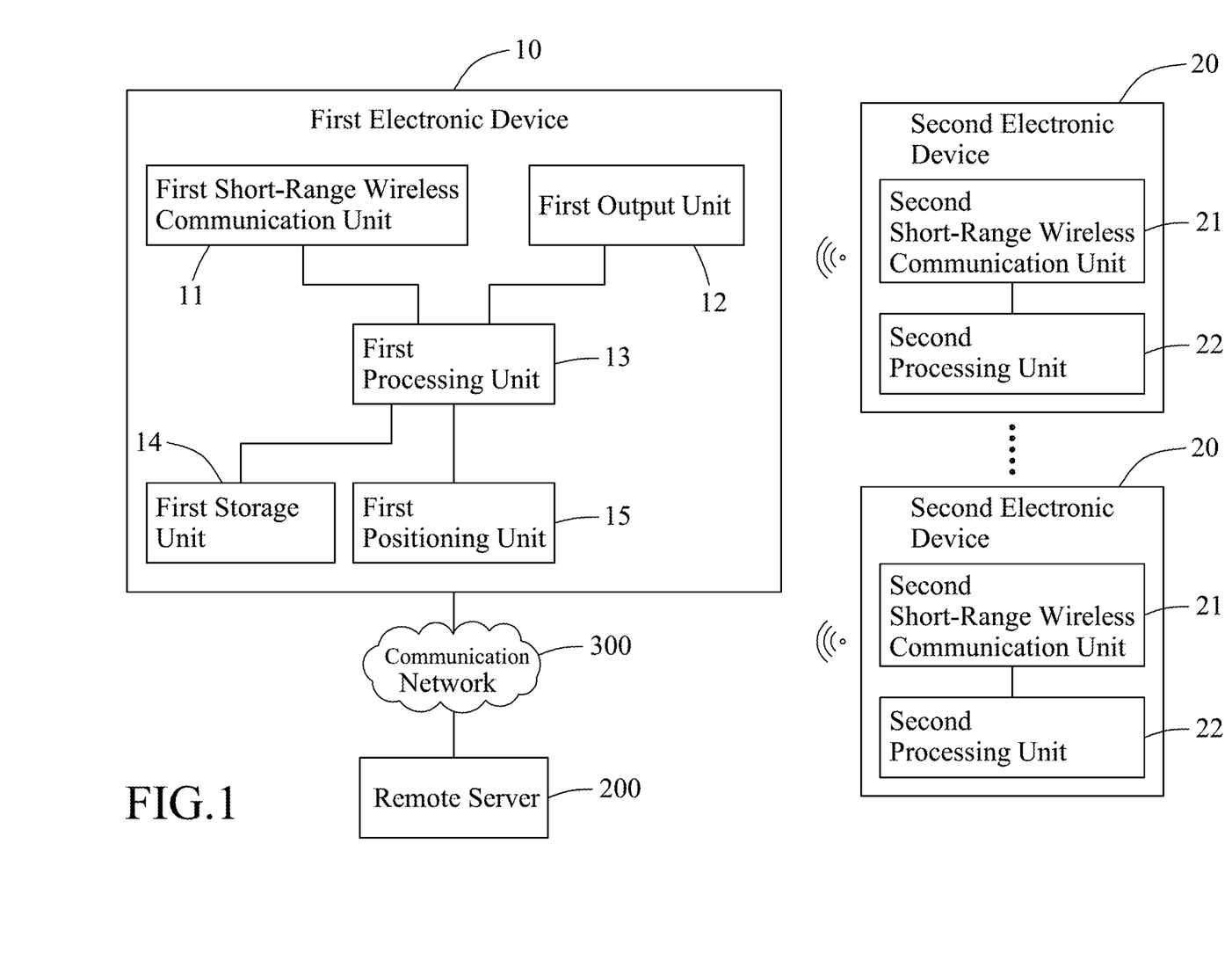
FIG. 1 is a schematic view of hardware connection of a first embodiment of the distance sensing system of the present invention.

Referring to FIG. 1, a first embodiment of the distance sensing system of the present invention is adapted to be electrically connected to a remote server 200 through a communication network 300, and includes a first electronic device 10 and a plurality of second electronic devices 20.

A first implementation aspect of the first embodiment is adapted for epidemic prevention warning. Therefore, the remote server 200 stores a plurality of sets of area data, and each set of area data is a place where an infected person or a person at high risk of being infected has stopped at.

In this implementation aspect, the first electronic device 10 is a portable electronic device, such as a smartphone, a tablet computer or a smartwatch, etc., and includes a first short-range wireless communication unit 11, a first output unit 12, a first processing unit 13 that is electrically connected to the first short-range wireless communication unit 11 and the first output unit 12, and a first storage unit 14 and a first positioning unit 15 that are electrically connected to the first processing unit 13.

The first short-range wireless communication unit 11 is used to receive and transmit signals by short-range wireless communication technologies, such as Bluetooth or Near-field communication (NFC), etc.

The first output unit 12 is, for example, a buzzer or a vibrator.

The first storage unit 14 is, for example, a non-volatile memory (NVM), and stores a lookup table. The lookup table contains a plurality of distance parameter values, a plurality of ranges of number of devices corresponding respectively to the distance parameter values, and two indoor-outdoor parameters corresponding to the distance parameter values. The indoor-outdoor parameters indicate indoor and outdoor, respectively, and each distance parameter value corresponds to one of the indoor-outdoor parameters.

It is particularly noted that the distance parameter values are negatively correlated with the ranges of number of devices in the lookup table, and the distance parameter value corresponding to the indoor-outdoor parameter that indicates indoor is greater than the distance parameter value corresponding to the indoor-outdoor parameter that indicates outdoor.

It should be noted that, in other implementation aspects, the distance parameter values may also be positively correlated with the ranges of number of devices in the lookup table, and the distance parameter value corresponding to the indoor-outdoor parameter that indicates indoor may also be smaller than the distance parameter value corresponding to the indoor-outdoor parameter that indicates outdoor. They are not limited to this embodiment.

The lookup table is, for example:

|  | The number of devices ≤5 | The number of devices >5 |
| --- | --- | --- |
| Indoor | 2 m | 1.5 m |
| Outdoor | 1.2 m | 1 m |

In some implementation aspects, the distance parameter value corresponding to the indoor-outdoor parameter that indicates indoor may also be equal to the distance parameter value corresponding to the indoor-outdoor parameter that indicates outdoor.

The first positioning unit 15 is, for example, a GPS chip, and is used to generate a positioning result. When the positioning unit is able to calculate a current position of the first electronic device 10, the positioning result indicates the current position of the first electronic device 10. When the positioning unit is not able to calculate the current position of the first electronic device 10, the positioning result indicates that positioning is not possible.

The first processing unit 13 is, for example, a central processing unit (CPU) inside the first electronic device 10, and is capable of receiving and transmitting wireless signals via the first short-range wireless communication unit 11 and controlling the first output unit 12 to output a notification which is ringing or vibration.

In the first embodiment, each of the second electronic devices 20 is a portable electronic device, such as a smartphone, a tablet computer or a smartwatch, etc., and includes a second short-range wireless communication unit 21, and a second processing unit 22 electrically connected to the second short-range wireless communication unit 21.

The second short-range wireless communication unit 21 is used to receive and transmit signals by short-range wireless communication technologies, such as Bluetooth or Near-field communication (NFC), etc.

The second processing unit 22 is, for example, a central processing unit (CPU) inside the second electronic device 20, and is capable of receiving and transmitting wireless signals via the second short-range wireless communication unit 21.

Figure 2:
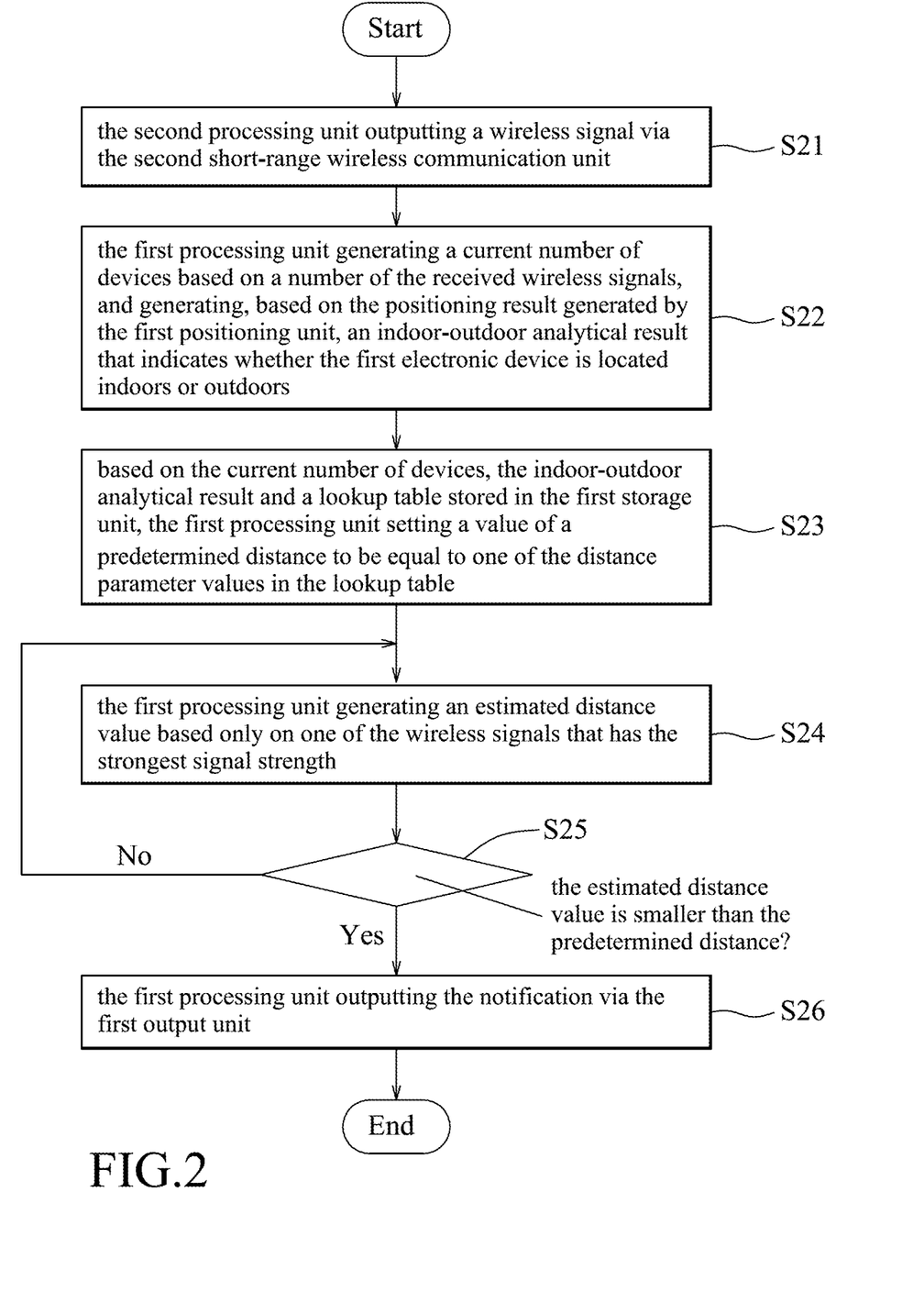
FIG. 2 is a flow chart of a first distance sensing procedure executed by the embodiment.

Referring to FIGS. 1 and 2, the following describes steps of a first distance sensing procedure executed by the first embodiment.

In step S21, the second processing unit 22 outputs a wireless signal via the second short-range wireless communication unit 21. Then, step S22 is executed.

In step S22, when the first processing unit 13 of the first electronic device 10 receives, via the first short-range wireless communication unit 11, the wireless signals from multiple ones of the second electronic devices 20, the first processing unit 13 generates a current number of devices based on a number of the received wireless signals, and generates an indoor-outdoor analytical result that indicates whether the first electronic device 10 is located indoors or outdoors based on the positioning result generated by the first positioning unit 15.

Further, the positioning result contains, for example, but not limited to, positioning data (e.g., longitude and latitude) and satellite signal strength. In this step, the first processing unit 13 determines whether the satellite signal strength is greater than a satellite signal predetermined threshold value based on the satellite signal strength contained in the positioning result. When the first processing unit 13 determines that the satellite signal strength is greater than the satellite signal predetermined threshold value, the indoor-outdoor analytical result generated by the first processing unit 13 indicates that the first electronic device 10 is located outdoors. When the first processing unit 13 determines that the satellite signal strength is not greater than the satellite signal predetermined threshold value, the indoor-outdoor analytical result generated by the first processing unit 13 indicates that the first electronic device 10 is located indoors.

More specifically, when a user enters an indoor public place carrying the first electronic device 10, the first electronic device 10 would receive the wireless signals transmitted from the surrounding second electronic devices 20 that are within a signal-receivable range (e.g., Bluetooth has a signal-receivable range of about 10 meters), and calculate the number of the received wireless signals so as to derive the number of second electronic devices 20 that are within the signal-receivable range (i.e., deriving the number of people around the user). In addition to calculating the number of wireless signals, the first electronic device 10 further generates the positioning result via the first positioning unit 15 to determine whether the first electronic device 10 is currently located indoors or outdoors. Then, step S23 is executed.

In step S23, after the first processing unit 13 of the first electronic device 10 generates the current number of devices and the indoor-outdoor analytical result, the first processing unit 13 of the first electronic device 10 sets a value of a predetermined distance to be equal to one of the distance parameter values based on the current number of devices, the indoor-outdoor analytical result and the lookup table, wherein the indoor-outdoor parameter corresponding to the distance parameter value is the same as the indoor-outdoor analytical result and the range of number of devices corresponding to the distance parameter value cover the current number of devices.

That is to say, the first electronic device 10 will set the predetermined distance to be the distance parameter value that fits the environment where the first electronic device 10 is currently in based on the current number of devices and the indoor-outdoor analytical result with reference the above table. That is to say, the distance that should be kept between the user and other people is adjusted according to the environment where the user is currently in. Then, step S24 is executed.

In step S24, the first electronic device 10 generates, based only on one of the wireless signals that has the strongest signal strength, an estimated distance value indicating an estimated distance between the second electronic device that outputs said wireless signal and the first electronic device 10.

More specifically, in this embodiment, the first electronic device 10 generates the estimated distance value based on the received signal strength indicator (RSSI) of the received wireless signal. Then, step S25 is executed.

In step S25, after the first electronic device 10 generates the estimated distance value corresponding to the wireless signal with the strongest signal strength, the first electronic device 10 determines whether the estimated distance value is smaller than the predetermined distance. If affirmative, step S26 is then executed. Otherwise, the flow goes back to step S24.

In step S26, when the first processing unit 13 of the first electronic device 10 determines that the estimated distance value is smaller than the predetermined distance, the first processing unit 13 outputs the notification via the first output unit 12.

It is further noted that, since the wireless signal with the strongest signal strength received by the first electronic device 10 is supposed to be outputted by the second electronic device 20 that is closest to the first electronic device 10, the first electronic device 10 only needs to determine whether the estimated distance value corresponding to the wireless signal with the strongest signal strength is smaller than the predetermined distance, in order to determine whether there is any second electronic device 20 within the predetermined distance, that is, to determine whether a distance between the user and other people is currently less than the predetermined distance. Further, when determining that the estimated distance value is smaller than the predetermined distance, the first processing unit 13 of the first electronic device 10 rings or vibrates via the first output unit 12 to alert the user that it is currently too close to other people.

In addition, at the same time as the first electronic device 10 is executing the foregoing steps S21-S26, the first processing unit 13 of the first electronic device 10 also receives the sets of area data from the remote server 200, and when determining that the current position indicated by the positioning data contained in the positioning result is covered by an area indicated by one of the sets of area data, outputs a notification via the first output unit 12 to remind the user to leave the area as soon as possible.

It is particularly noted that, in other implementation aspects, the first processing unit 13 can generate a plurality of estimated distance values based on multiple wireless signals that have stronger signal strength (e.g., a number N of wireless signals) among the wireless signals (e.g., a number M of wireless signal), where M is an integer greater than one and N is an integer greater than one and not greater than M. For example, if the first processing unit 13 receives five (M=5) wireless signals respectively from different second electronic devices, the first processing unit 13 can generate, based on two (N=2) wireless signals with stronger signal strength among them, two estimated distance values corresponding respectively to the two wireless signals. After generating the two estimated distance values, the first processing unit 13 determines whether each of the two estimated distance values is smaller than the predetermined distance. When determining that the two estimated distance values are both smaller than the predetermined distance, the first processing unit 13 then proceed to execute step S26.

Figure 3:
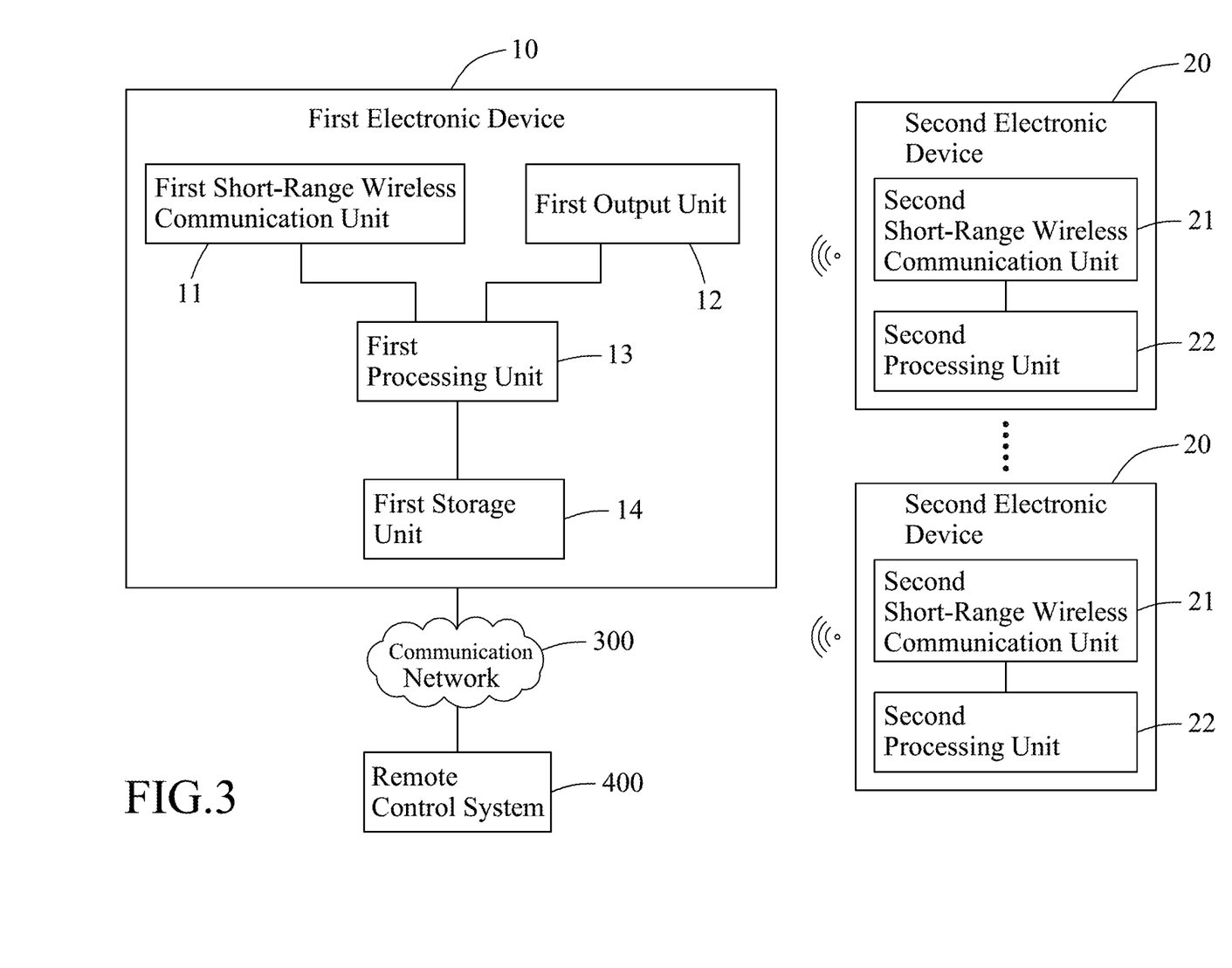
FIG. 3 is a schematic view of hardware connection of a second embodiment of the distance sensing system of the present invention.

Referring to FIG. 3, the following describes a second embodiment of the distance sensing system of present invention that is adapted to be connected to a remote control system 400 through a communication network 300, and includes a first electronic device 10 and a plurality of second electronic devices 20. In this embodiment, the first electronic device 10 and the second electronic devices 20 are each installed, for example, in a drone, an unmanned self-driving car or a biomimetic fish, but are not limited to the above.

The first electronic device 10 includes a first short-range wireless communication unit 11, a first output unit 12, a first processing unit 13 that is electrically connected to the first short-range wireless communication unit 11 and the first output unit 12, and a first storage unit 14 that is electrically connected to the first processing unit 13. Each second electronic device 20 includes a second short-range wireless communication unit 21, and a second processing unit 22 that is electrically connected to the second short-range wireless communication unit 21.

The first short-range wireless communication unit 11, the first output unit 12, the first processing unit 13, the first storage unit 14, the second short-range wireless communication unit 21 and the second processing unit 22 are all the same as the first short-range wireless communication unit 11, the first output unit 12, the first processing unit 13, the first storage unit 14, the second short-range wireless communication unit 21 and the second processing unit 22 described in the first embodiment, and will not be repeatedly described herein.

The following illustration uses an example that the first electronic device 10 and the second electronic devices 20 are each installed in a biomimetic fish. The first short-range wireless communication unit 11, the first output unit 12, the first processing unit 13 and the first storage unit 14 are installed in one biomimetic fish, and the second electronic devices 20 are installed in other biomimetic fish, respectively.

In this embodiment, the lookup table is, for example, as shown in the following table. In this embodiment, it is not necessary to distinguish between indoor and outdoor, and thus only one set of distance parameter values is used in the description.

|  | The number of devices ≤5 | The number of devices >5 |
| --- | --- | --- |
| Distance parameter value | 1.2 m | 1 m |

Different from the first embodiment, since the first processing unit 13 does not need to determine whether it is currently located indoors or outdoors in this embodiment and since the first electronic device 11 of this embodiment does not include the first positioning unit 15 that is described in the foregoing first embodiment, the first processing unit 13 sets the value of the predetermined distance to be equal to one of the distance parameter values only based on the current number of devices in step S23, and then generates the estimated distance value in step S24.

For example, in this embodiment, if the current number of devices generated by the first processing unit 13 based on the number of received wireless signals indicates that the current number of second electronic devices 20 (i.e., excluding itself, the number of other biomimetic fish) is less than or equal to 5, the predetermined distance is 1.2 m. If the current number of devices indicates that the current number of second electronic devices 20 (i.e., excluding itself, the number of other biomimetic fish) is greater than 5, then the predetermined distance is 1 m.

When the first processing unit 13 determines that the estimated distance value is smaller than the predetermined distance, the first processing unit 13 outputs a notification to a remote control system 400 via, for example, the first short-range wireless communication unit 11. By receiving the notification, the remote control system 400 determines that the biomimetic fish, in which the first electronic device 10 is installed, might be about to have a collision, and then changes to using a remote control manner to control the biomimetic fish to change direction or to stop moving, so as to prevent the collision from occurring. It is particularly noted that the remote control system 400 can automatically control the biomimetic fish, or can control the biomimetic fish by manual operation. In other implementation aspects, the first processing unit 13 may utilize a communication module (not shown) that is originally possessed by the biomimetic fish to output the notification to the remote control system 400, and it is not limited to the above.

The above-mentioned manner that the first processing unit 13 outputs a notification to the remote control system 400 via the first short-range wireless communication unit 11 can be also used in a case where the first electronic device 10 and the second electronic devices 20 are installed in unmanned self-driving cars or drones, such that when an unmanned self-driving car or a drone is about to have a collision, the remote control system 400 remotely controls the unmanned self-driving car or the drone so as to prevent the collision from occurring.

In summary, the distance sensing system of the present invention, by the first electronic device 10, receives the wireless signal, generates the corresponding estimated distance value based on the wireless signal, and outputs the notification when it is determined that the estimated distance value is smaller than the predetermined distance, so as to notify the user when the user is too close to other people. In addition, the first electronic device 10 sets the value of the predetermined distance to be equal to one of the distance parameter values based on the current number of devices, the indoor-outdoor analytical result and the lookup table, so as to allow the first processing unit 13 of the first electronic device 10 to change the value of the predetermined distance according to the environment where the first electronic device 10 is currently in. Thus, the purpose of the present invention can certainly be achieved.

However, the above are merely the embodiments of the present invention, and certainly the scope of the present invention cannot be limited thereby. Any simple equivalent variation and modification made according to the claims of the present invention and the contents of the patent specification shall fall within the scope covered by a patent to the present invention.

DESCRIPTION OF REFERENCE NUMERALS

10 . . . First Electronic Device
11 . . . First Short-Range Wireless Communication Unit
12 . . . First Output Unit
13 . . . First Processing Unit
14 . . . First Storage Unit
15 . . . First Positioning Unit
20 . . . Second Electronic Device
21 . . . Second Short-Range Wireless Communication Unit
22 . . . Second Processing Unit
200 . . . Remote Server
300 . . . Communication Network
400 . . . Remote Control System
S21-S26 . . . Step

The invention claimed is:

1. A distance sensing system adapted to be electrically connected to a second electronic device, the second electronic device including a second short-range wireless communication unit, and a second processing unit that is electrically connected to the second short-range wireless communication unit, the second processing unit outputting a wireless signal via the second short-range wireless communication unit, the distance sensing system comprising:
   a first short-range wireless communication unit;
   a first output unit;
   a first processing unit electrically connected to the first short-range wireless communication unit and the first output unit;
   the first processing unit generating an estimated distance value that indicates an estimated distance between itself and the second electronic device based on signal strength of the wireless signal when the first processing unit receives, via the first short-range wireless communication unit, the wireless signal from the second electronic device;
   the first processing unit outputting a notification when the first processing unit determines that the estimated distance value is smaller than a predetermined distance;
   wherein the distance sensing system is further adapted to be electrically connected to a number M of second electronic devices, where M is an integer greater than one;
   wherein, when the first processing unit receives, via the first short-range wireless communication unit, the wireless signals from multiple ones of the second electronic devices, the first processing unit generates the estimated distance values based only on a number N of wireless signals with the strongest signal strength among the wireless signals, where N is an integer greater than one and not greater than M;
   wherein, when the first processing unit determines that the estimated distance values are all smaller than the predetermined distance, the first processing unit outputs the notification via the first output unit.

2. The distance sensing system as claimed in claim 1, further comprising a first storage unit storage unit electrically connected to the first processing unit, the first storage unit storing a lookup table, the lookup table containing a plurality of distance parameter values and a plurality of ranges of number of devices that correspond respectively to the distance parameter values;
   before the first processing unit determines whether the estimated distance value is smaller than the predetermined distance, the first processing unit generating a current number of devices based on a number of the received wireless signals, and setting a value of the predetermined distance to be equal to one of the distance parameter values based on the current number of devices and the lookup table, wherein a range of the number of devices corresponding to the distance parameter value cover the current number of devices.

3. The distance sensing system as claimed in claim 1, further comprising a first storage unit electrically connected to the first processing unit, and a first positioning unit electrically connected to the first processing unit, the first positioning unit being used to generate a positioning result, the first storage unit storing a lookup table, the lookup table containing two distance parameter values, and two indoor-outdoor parameters that correspond respectively to the distance parameter values, the indoor-outdoor parameters indicating indoor and outdoor, respectively;

before the first processing unit determines whether the estimated distance value is smaller than the predetermined distance, the first processing unit generating, based on the positioning result, an indoor-outdoor analytical result that indicates whether it is located indoors or outdoors, wherein the indoor-outdoor analytical result generated by the first processing unit indicates that it is located outdoors when the first processing unit determines that satellite signal strength contained in the positioning result is greater than a satellite signal predetermined threshold value, and the indoor-outdoor analytical result generated by the first processing unit indicates that it is located indoors when the first processing unit determines that the satellite signal strength is not greater than the satellite signal predetermined threshold value;

the first processing unit setting a value of the predetermined distance to be equal to one of the distance parameter values based on the indoor-outdoor analytical result and the lookup table, wherein the indoor-outdoor parameter corresponding to the distance parameter value is the same as the indoor-outdoor analytical result.

4. The distance sensing system as claimed in claim 1, further comprising a first positioning unit electrically connected to the first processing unit, and being further adapted to be electrically connected to a remote server, the first positioning unit being used to generate a positioning result that indicates a current position;

the first processing unit receiving a plurality of sets of area data from the remote server, and outputting a notification via the first output unit when determining that the current position indicated by the positioning result is covered by an area indicated by one of the sets of area data.

5. A distance sensing method executed by a distance sensing system, the distance sensing system including a first electronic device and a second electronic device, the first electronic device including a first short-range wireless communication unit, a first output unit, and a first processing unit that is electrically connected to the first short-range wireless communication unit and the first output unit, the second electronic device including a second short-range wireless communication unit, and a second processing unit that is electrically connected to the second short-range wireless communication unit, the second processing unit outputting a wireless signal via the second short-range wireless communication unit, the distance sensing method comprising:

the first processing unit of the first electronic device generating an estimated distance value that indicates an estimated distance between the first electronic device and the second electronic device based on signal strength of the wireless signal when the first processing unit receives, via the first short-range wireless communication unit, the wireless signal from the second electronic device; and the first processing unit of the first electronic device outputting a notification when the first processing unit determines that the estimated distance value is smaller than a predetermined distance;

wherein the first electronic device further includes a first storage unit electrically connected to the first processing unit, and a first positioning unit electrically connected to the first processing unit, the first positioning unit being used to generate a positioning result, the first storage unit storing a lookup table, the lookup table containing two distance parameter values, and two indoor-outdoor parameters that correspond respectively to the distance parameter values, the indoor-outdoor parameters indicating indoor and outdoor, respectively, wherein the distance sensing method further comprises:

before the first processing unit of the first electronic device determines whether the estimated distance value is smaller than the predetermined distance, the first processing unit generating, based on the positioning result, an indoor-outdoor analytical result that indicates whether the first electronic device is located indoors or outdoors, wherein the indoor-outdoor analytical result generated by the first processing unit indicates that the first electronic device is located outdoors when the first processing unit determines that satellite signal strength contained in the positioning result is greater than a satellite signal predetermined threshold value, and the indoor-outdoor analytical result generated by the first processing unit indicates that the first electronic device is located indoors when the first processing unit determines that the satellite signal strength is not greater than the satellite signal predetermined threshold value, and the first processing unit of the first electronic device setting a value of the predetermined distance to be equal to one of the distance parameter values based on the indoor-outdoor analytical result and the lookup table, wherein the indoor-outdoor parameter corresponding to the distance parameter value is the same as the indoor-outdoor analytical result.

6. The distance sensing method as claimed in claim 5, wherein the lookup table contains a plurality of distance parameter values, and a plurality of ranges of number of devices that correspond respectively to the distance parameter values, the distance sensing method further comprising:

before the first processing unit of the first electronic device determines whether the estimated distance value is smaller than the predetermined distance, the first processing unit generating a current number of devices based a number of the received wireless signals, and setting a value of the predetermined distance to be equal to one of the distance parameter values based on the current number of devices and the lookup table, wherein the numbers of devices corresponding to the distance parameter value cover the current number of devices.

7. A distance sensing system adapted to be electrically connected to a second electronic device, the second electronic device including a second short-range wireless communication unit, and a second processing unit that is electrically connected to the second short-range wireless communication unit, the second processing unit outputting a wireless signal via the second short-range wireless communication unit, the distance sensing system comprising:

a first short-range wireless communication unit;

a first output unit;

a first processing unit electrically connected to the first short-range wireless communication unit and the first output unit;

the first processing unit generating an estimated distance value that indicates an estimated distance between itself and the second electronic device based on signal strength of the wireless signal when the first processing unit receives, via the first short-range wireless communication unit, the wireless signal from the second electronic device;

the first processing unit outputting a notification when the first processing unit determines that the estimated distance value is smaller than a predetermined distance;

wherein the distance sensing system further comprises a first storage unit electrically connected to the first processing unit, and a first positioning unit electrically connected to the first processing unit, the first positioning unit being used to generate a positioning result, the first storage unit storing a lookup table, the lookup table containing two distance parameter values, and two indoor-outdoor parameters that correspond respectively to the distance parameter values, the indoor-outdoor parameters indicating indoor and outdoor, respectively;

wherein before the first processing unit determines whether the estimated distance value is smaller than the predetermined distance, the first processing unit generates, based on the positioning result, an indoor-outdoor analytical result that indicates whether it is located indoors or outdoors, wherein the indoor-outdoor analytical result generated by the first processing unit indicates that it is located outdoors when the first processing unit determines that satellite signal strength contained in the positioning result is greater than a satellite signal predetermined threshold value, and the indoor-outdoor analytical result generated by the first processing unit indicates that it is located indoors when the first processing unit determines that the satellite signal strength is not greater than the satellite signal predetermined threshold value;

wherein the first processing unit sets a value of the predetermined distance to be equal to one of the distance parameter values based on the indoor-outdoor analytical result and the lookup table, wherein the indoor-outdoor parameter corresponding to the distance parameter value is the same as the indoor-outdoor analytical result.

8. The distance sensing system as claimed in claim 7, further comprising a first storage unit storage unit electrically connected to the first processing unit, the first storage unit storing a lookup table, the lookup table containing a plurality of distance parameter values and a plurality of ranges of number of devices that correspond respectively to the distance parameter values;

before the first processing unit determines whether the estimated distance value is smaller than the predetermined distance, the first processing unit generating a current number of devices based on a number of the received wireless signals, and setting a value of the predetermined distance to be equal to one of the distance parameter values based on the current number of devices and the lookup table, wherein the range of number of devices corresponding to the distance parameter value cover the current number of devices.

9. The distance sensing system as claimed in claim 7, further adapted to be electrically connected a plurality of second electronic devices;

when the first processing unit receives, via the first short-range wireless communication unit, the wireless signals from multiple ones of the second electronic devices, the first processing unit generating the estimated distance value based only on one of the wireless signals that has the strongest signal strength.

10. The distance sensing system as claimed in claim 7, further adapted to be electrically connected to a number M of second electronic devices, where M is an integer greater than one;

when the first processing unit receives, via the first short-range wireless communication unit, the wireless signals from multiple ones of the second electronic devices, the first processing unit generating the estimated distance values based only on a number N of wireless signals with the strongest signal strength among the wireless signals, where N is an integer greater than one and not greater than M;

when the first processing unit determines that the estimated distance values are all smaller than the predetermined distance, the first processing unit outputting the notification via the first output unit.

11. The distance sensing system as claimed in claim 7, further comprising a first positioning unit electrically connected to the first processing unit, and being further adapted to be electrically connected to a remote server, the first positioning unit being used to generate a positioning result that indicates a current position;

the first processing unit receiving a plurality of sets of area data from the remote server, and outputting a notification via the first output unit when determining that the current position indicated by the positioning result is covered by an area indicated by one of the sets of area data.

\* \* \* \* \*